United States Patent
Andrews

(10) Patent No.: US 8,877,844 B2
(45) Date of Patent: Nov. 4, 2014

(54) HIGHLY PIGMENTED AQUEOUS COATING COMPOSITIONS WITH IMPROVED RESISTANCE TO BLOCKING

(71) Applicant: Wacker Chemical Corporation, Adrian, MI (US)

(72) Inventor: Amanda Andrews, Petersburg, MI (US)

(73) Assignee: Wacker Chemical Corporation, Adrian, MI (US)

( * ) Notice: Subject to any disclaimer, the term of this patent is extended or adjusted under 35 U.S.C. 154(b) by 116 days.

(21) Appl. No.: 13/742,390

(22) Filed: Jan. 16, 2013

(65) Prior Publication Data

US 2014/0200296 A1   Jul. 17, 2014

(51) Int. Cl.
*C09D 7/12* (2006.01)
*C09D 201/00* (2006.01)

(52) U.S. Cl.
CPC .................................. *C09D 7/1233* (2013.01)
USPC ........................................................ 524/188

(58) Field of Classification Search
CPC ............................... C09D 7/12; C09D 201/00
USPC ................................................ 524/188, 261
See application file for complete search history.

(56) References Cited

U.S. PATENT DOCUMENTS

| | | | |
|---|---|---|---|
| 2,985,544 A | | 5/1961 | deMonterey et al. |
| 5,432,007 A | * | 7/1995 | Naito ............................ 428/447 |
| 2002/0010273 A1 | * | 1/2002 | Matsumura et al. .......... 525/100 |
| 2006/0089478 A1 | | 4/2006 | Noda |

FOREIGN PATENT DOCUMENTS

| | | |
|---|---|---|
| WO | 01/47823 A2 | 7/2001 |
| WO | WO 0147823 A2 * | 7/2001 |

OTHER PUBLICATIONS

Walter Noll, Chemistry and Technology of Silicones, Academic Press, New York, Copyright 1968, pp. 2-7.

* cited by examiner

*Primary Examiner* — Kelechi Egwim
(74) *Attorney, Agent, or Firm* — Brooks Kushman P.C.

(57) ABSTRACT

Blocking resistance of highly pigmented aqueous coating compositions is improved by addition of an anti-blocking organosilicon composition containing.
A) 100 parts by weight of at least one aminoalkyl-functional organopolysiloxane;
B) from 1 to 20 parts by weight of at least one aminoalkyl-functional alkoxysilane or partial hydrolysis product thereof, and
C) from 10 to 500 parts by weight of at least one silanol-functional organopolysiloxane free of aminoalkyl groups,
wherein the weight percentages of A), B), and C) are relative to the total weight of components A), B), and C).
The organosilicon composition is advantageously supplied in the form of an aqueous emulsion.

15 Claims, No Drawings

HIGHLY PIGMENTED AQUEOUS COATING COMPOSITIONS WITH IMPROVED RESISTANCE TO BLOCKING

BACKGROUND OF THE INVENTION

1. Field of the Invention

The invention pertains to highly pigmented aqueous coating compositions with improved resistance to blocking, and to a method of improving blocking resistance through the addition of a functional organopolysiloxane emulsion to a highly pigmented aqueous coating composition.

2. Background Art

Pigmented aqueous coating systems ("paints") have been in use for many years now. These systems contain a film-forming organic binder in finely dispersed form, the organic binder generally being thermoplastic or thermosetting in nature. In some cases, combinations of thermoplastic and thermosetting binders are used, or essentially thermoplastic binders containing a limited amount of crosslinkable functional groups are used. After the coating has been applied, the organic binders coalesce to form a film as the aqueous phase evaporates. In the case where crosslinkable functionalities are present, these may begin to crosslink at this point, or crosslinking may take place very slowly, for example under the influence of atmospheric oxygen or of light.

The chemistries of aqueous coating systems vary widely with the end use application. For example, in interior and exterior house paints, the so-called "latex paints," the organic binder may be a relatively simple addition polymer, such as polyvinyl acetate, copolymers of ethylene and vinyl acetate, and polymers derived from other monomers, such as acrylates, methacrylates, vinyl chloride, styrene, etc., often with functional groups such as carboxylic acid groups, anhydride groups, epoxy groups, etc. In the automotive sector, on the other hand, the chemistry is much different, and may include polyurethane resins, aminoplast resins, melamine formaldehyde resins, and complex mixtures of these.

When the aqueous coating system is desired to be opaque, and in particular both opaque and colored, pigments are added. In some paints, particularly latex house paints, some opacity may be provided by the thermoplastic binder particles themselves. However, in most cases, pigments are required to be added, at times in high quantity.

The pigments actually perform several functions in aqueous coating systems. For example, incorporation of pigments may increase the "body" of the coating ("paint"), and may increase its resistance to sagging and running Very fine particles are not as effective as larger particles in opacifying power or pigmentary power, but may serve to alter the rheology of the coating, for example in terms of thixotropy or dilatency, or in Newtonian systems, by simply increasing viscosity.

For highly opaque coatings, especially highly opaque and highly colored systems, a very high pigment loading is necessary. However, with high pigment loadings, a complication arises in that the dry coatings tend to block. The reason why highly pigmented aqueous coatings develop blocking behavior is not completely understood and is even somewhat counterintuitive, but this behavior is quite undesirable, as dry but freshly painted surfaces will be much more likely to attract dirt and dust, and dry but freshly painted surfaces may stick to each other or to surfaces they abut, a phenomenon called "blocking" This is especially a problem in industrial manufacturing, where painted articles of metal, plastic, wood, etc. must then be handled without the painted surfaces being contacted by other surfaces.

It would be desirable to reduce the blocking behavior of highly pigmented aqueous coating systems without interfering with the cure or drying of these systems and without affecting the uncured system stability.

SUMMARY OF THE INVENTION

It has now been surprisingly discovered that blocking resistance in highly pigmented aqueous coating systems is highly improved by incorporating into the coating composition an organopolysiloxane emulsion containing at least one aminoalkyl-functional organopolysiloxane and at least one aminoalkyl-functional silane or partial hydrolysate thereof, and a silanol-functional organopolysiloxane.

DETAILED DESCRIPTION OF THE PREFERRED EMBODIMENT(S)

The organopolysiloxane emulsions of the present invention may be prepared as a separate aqueous emulsion, which is preferable, or may be prepared during coating formulation, e.g. by addition of each organosilicon component separately, or as one or more subassemblies, to the coating during its formulation.

As a preformed emulsion, the organopolysiloxane emulsion contains water as a continuous phase, and preferably from 20 to 70 weight percent, based on the total weight of the emulsion, of the organosilicon components, more preferably 30 to 70 weight percent, and most preferably 40 to 70 weight percent. Higher organosilicon content is possible provided a stable oil in water emulsion can be made. Lower organosilicon content generally requires higher shipping costs, but these are negated if prepared on site, for example. A lower organosilicon content emulsion may advantageously replace part or all of the formulation water used to prepare the coating, for example.

The organosilicon components include A), an organopolysiloxane bearing aminoalkyl functionality, B), an organosilane bearing aminoalkyl functionality, and/or a partial hydrolysate thereof and C), a silanol-stopped organopolysiloxane. This latter organopolysiloxane may also include additional functional groups such as carboxylic acid groups, cyano groups, haloalkyl groups, or other functional groups, all of which are well known in organosilicon chemistry. These functional groups preferably exhibit no reaction with aminoalkyl groups in the aqueous paint composition.

The organopolysiloxane "backbone" of both components A and C are both conventional, i.e. are predominantly $R^3SiO_{1/2}$ "M" units and $R^2SiO_{2/2}$ "D" units. However, they may also contain minor amounts, i.e., less than 5 mol percent, preferably less than 2 mol percent, yet more preferably, less than 1 mol percent, and most preferably about 0 mol percent of $RSiO_{3/2}$ "T" and $SiO_{4/2}$ ("Q") units. All these units are well known in organosilicon chemistry, as evidenced by Walter Noll, *Chemistry and Technology of Silicones*, Academic Press, New York, ©1968, pp. 2 to 7.

Thus, organopolysiloxanes A and C may be described as linear or lightly branched. In any case, they are liquids, with the viscosity of component A being preferably 50 to 50,000 mPas at 25° C., more preferably 100 to 5000 mPas, yet more preferably 200 to 3000 mPas, and most preferably from 500 to 2000 mPas.

The R groups on the various M, D and Q units may be divided into $R^1$, $R^2$, and $R^3$ groups, where $R^1$ groups are conventional hydrocarbon groups such as alkyl, cycloalkyl, aryl, arylalkyl, alkaryl, and the like, including aryl groups with heteroatoms in the aryl ring such as nitrogen, oxygen, and sulfur atoms; $R^2$ is an aminoalkyl group; and $R^3$ are optional groups other than the $R^1$ and $R^2$ groups.

The $R^1$ groups are the predominant R group and generally comprise more than 80 mol percent of all R groups, more preferably greater than 90 mol percent. Examples of $R^1$ groups are alkyl groups such as $C_{1-18}$ alkyl groups, preferably lower $C_{1-4}$ alkyl groups such as methyl, ethyl, propyl, and butyl, with the methyl groups being particularly preferred. However, a generally minor amount of long chain alkyl groups such as $C_{8-18}$ alkyl groups may also be useful, in particular to aid in adhesion of the aqueous coating system to certain substrates. $R^1$ may also be an aryl group such as a phenyl, naphthyl, or phenanthryl group, with the phenyl group being preferred; may be an arylalkyl such as benzyl or a or β-phenylethyl; may be alkaryl such as tolyl or xylyl, and may be cycloalkyl, such as cyclohexyl, cyclohexylmethyl, methylcyclohexyl, methylcyclohexylmethyl, etc. Most preferably, the $R^1$ groups are selected from methyl and phenyl, with methyl groups predominating. Preferably, all $R^1$ are methyl. A further preference is for the most substantial part of the $R^1$ groups to be methyl groups, with the remainder being long chain alkyl groups. Another preference is for a most substantial part of the $R^1$ groups to be methyl groups, with the remainder being long chain alkyl and phenyl groups.

In the A organopolysiloxanes and also in the B organosilanes or partial hydrolysates thereof, aminoalkyl groups $R^2$ are present. The aminoalkyl groups may be simple aminoalkyl groups such as

where R' is hydrogen or $C_{1-18}$ alkyl, more preferably $C_{1-4}$ alkyl, and $R^4$ is an alkylene radical, for example a $C_{1-18}$ alkylene radical such as methylene, ethylene, propylene, butylene, hexylene, cyclohexylene, etc.; or $R^2$ may be a more complex aminoalkyl group of the formula

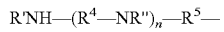

where R" has the meaning of R' and is preferably hydrogen, and wherein $R^5$ has the meaning of $R^4$, and is preferably ethylene or propylene, i.e. —$CH_2CH_2$— or —$CH_2CH_2CH_2$—.

The aminoalkylsilanes are aminoalkylsilanes corresponding to the formula

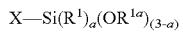

where X is an Si—C bonded aminoalkyl group $R^2$ as previously defined and $R^{1a}$ is as previously defined as for $R^1$, but with the addition of hydrogen, with preference being given to hydrogen methyl, and ethyl, more preferably methyl. In these silanes, a may be 0, 1, or 2, preferably 0 or 1, and most preferably 0. Preferred aminoalkylsilanes include aminopropyltrimethoxysilane, aminopropylmethyldimethoxysilane, aminopropyltriethoxysilane, N-(2-aminoethyl)-3-aminopropyltrimoxysilane, N-(2-aminoethyl)-3-aminopropylmethyldimethoxysilane, and mixtures thereof.

The partial hydrolysates which are useful are prepared by hydrolyzing the starting aminoalkylalkoxysilanes with less than a stoichiometric amount of water, eliminating alcohol. The partial hydrolysates are thus oligomeric, generally branched organopolysiloxanes bearing a plurality of aminoalkyl groups, and also bearing residual alkoxy groups and/or silicon-bonded —OH groups.

Relative to 100 parts by weight of component A, the aminoalkylalkoxysilane component B is present in 1 to 20 parts by weight, more preferably 2 to 10 parts by weight, and most preferably 3-7 parts by weight.

Component C is a silanol-stopped organopolysiloxane free of aminoalkyl groups. Component C is preferably an α,ω-disilanol-capped polyorganosiloxane such as a polydimethylsiloxane bearing terminal Si-bonded hydroxyl groups. The viscosity of these organopolysiloxanes may span a wide range, but is preferably from 50 mPas at 25° C. to 50,000 mPas, more preferably from 1000 mPas to 10,000 mPas.

The component C organopolysiloxanes preferably have conventional alkyl or aryl groups bound to silicon. Methyl groups preferably comprise the majority of such groups. However, methylphenylsiloxy groups may be preferable for some application, and "unconventional" long chain alkyl groups may also be present. The latter may aid in repaintability. With respect to the R groups contained in the organopolysiloxanes C, please note the definition of $R^1$ groups previously set forth for component A.

Other than the alkyl and aryl groups just mentioned, a wide variety of other groups $R^3$ may be present, as long as these are compatible with the aminoalkyl groups of the A and B components. Thus, for example, epoxy groups and anhydride groups are not preferred, since these readily react with amino groups, unless the latter are protonated. However, cyano groups, haloalkyl groups, Si—C bonded polyether groups and the like are very suitable.

The C component is preferably present in an amount of from 10 to 500 parts per 100 parts of component A, more preferably 100 to 400 parts, and most preferably 150-300 parts per 100 parts of component A.

The compositions, whether prepared together, which is preferable, or separately, require the use of an emulsifier in an amount necessary to form a stable emulsion. Any suitable emulsifier or combination of a plurality of emulsifiers can be used. These include anionic, cationic, zwitterionic, and nonionic surfactants. Non-ionic surfactants are preferred. Most preferred are polyoxyalkylene ether surfactants such as oxyethylated fatty alcohols and fatty acids. It may be convenient to use a combination of high HLB and low HLB surfactants. Preferred surfactants are 5 and 10 mol oxyethylates of fatty alcohols. The amount of surfactant will vary depending upon the nature of the surfactant, but is generally from about 1 weight percent to about 20 weight percent based on the total weight of the emulsion, more preferably 4 to about 12 weight percent. If the organosilicon components are to be added separately to the pigmented paint, then the amount of surfactant to be added may be less if the paint is ordinarily formulated with surfactants or protective colloids. In any event, the surfactant(s) must be present in an amount effective to provide a stable aqueous emulsion.

Any suitable method of forming the emulsions may be used, and numerous such methods are disclosed in the patent and non-patent literature, including batch, semi-batch, and continuous processes. The ingredients are generally mixed under high shear, for example with the use of rotor/stator mixers. In a preferred method, the organosilicon ingredients and surfactant are mixed with limited water to form a "stiff phase" emulsion, which may be a water-in-oil emulsion, and to this highly viscous emulsion is added the remainder of the water under high shear, continuously, in increments, or all at once, upon which addition the emulsion inverts to an oil-in-water emulsion with a very small and reproducible particle size. When the emulsions are not to be immediately consumed, it is advisable to include one or more biocides to prevent microbial growth during storage. Numerous commercial biocides are useful for this purpose. When used, the biocides are preferably present in an amount of from 0.001 to 1 weight percent based on total emulsion weight, more preferably 0.02 to 0.5 weight percent.

It is preferable that a single emulsion be prepared with an organosilicon compound content of 20 to 70 weight percent, and this emulsion then be added to the coating formulation, based on a 60 weight percent emulsion, in amounts of from 0.5 weight percent to about 15 weight percent, based on the weight of the final coating formulation, preferably 1 to 12 weight percent, more preferably 2 to 10 weight percent, and most preferably 3-8 weight percent. When emulsions of lower or higher organosilicon content are used, the amounts are correspondingly higher or lower, respectively, and can readily be calculated.

Since the organosilicon compounds are preferably already in the form of an emulsion, the addition to the "paint" may take place by simple mixing, i.e. using paddle mixers, vane mixers, and the like. When the organosilicon compounds are added neat to the paint, more intensive mixing is generally necessary in order to form a fine and stable emulsion. In any case, the organosilicon compounds showed not separate from the aqueous coating formulation rapidly, and if separation occurs, must be capable of re-emulsification by simple shaking or stirring as is commonly practiced with all paints prior to use.

Blocking resistance is assessed by ASTM D4946-89, which provides the following rating system:

TABLE 1

| Blocking Resistance Numerical Rating | Type of Separation | Performance |
|---|---|---|
| 10 | no tack | perfect |
| 9 | trace tack | excellent |
| 8 | very slight tack | very good |
| 7 | very slight tack to slight | good to very good |
| 6 | slight tack | good to very good |
| 5 | moderate tack | fair |
| 4 | very tacky; no seal | poor to fair |
| 3 | 5 to 25% seal | poor |
| 2 | 25 to 50% seal | very poor |
| 1 | 50 to 75% | very poor |
| 0 | 75 to 100% seal | very poor |

The coating formulations are more blocking resistant than the same coating formulation without the organosilicon anti-blocking formulation, preferably having, in order of increasing preference, a blocking resistance which is higher by 1, 1.5, 2, 3, or 4 units, and preferably has a blocking resistance rating, in order of increasing preference, of 7, 8, 9, or greater than 9.

EXAMPLES

An emulsion according to the invention is prepared by preemulsifying 19.7 parts of a 0.3 amine equivalent number polydimethylsiloxane containing N-(2-aminoethyl)-3-aminopropyl groups, having a viscosity of 1000 mPas at 25° C., 39.3 parts of a 6000 mPas silanol stopped polydimethylsiloxane; and 0.9 parts N-(2-aminoethyl)-3-aminopropylmethyldimethoxysilane with 11.8 parts of a mixture of polyoxyethylated alcohol surfactants in a 1:2 ratio by weight in sufficient water to make a 50 weight percent emulsion. The stiff phase which formed by high shear emulsification with an Ultra-Turrax mixer is diluted with 28.6 parts water, and 4.5 parts of biocides are added. The resulting emulsion has an organosilicon content of about 60 weight percent, milky white appearance and a pH of 9-10.

Examples 2-7 and Comparative Example C1

To a commercial high pigment content Interior Behr Ultra-Premium deep base color Chocolate in an Eggshell sheen was added the inventive emulsion in amounts of from 1 to 10% by weight. Test panels were produced by using an applicator blade with a 6-mil clearance to sealed paper test chards. A panel with no additive was also prepared for comparative purposes (Comparative Example C1). Following ASTM D4926 the panels were conditioned at room temperature for 7 days then cut out 3.8 cm by 3.8 cm sections of the paint chart. The cut sections were placed with the paint surfaces face to face for each paint. Weights, stoppers were placed in oven for 30 minutes then allowed to cool for a half hour, and then by slow and steady force, the sections were pulled apart next to the ear to hear the degree of tack. The blocking was rated by ASTM D4946-89, and the results are as follows.

TABLE 2

| Example | C1 | 2 | 3 | 4 | 5 | 6 | 7 |
|---|---|---|---|---|---|---|---|
| wt. % organosilicon composition (as 60% emulsion) | 0 | 1 | 2 | 3 | 5 | 7.5 | 10 |
| Blocking Resistance | 6 | 8 | 7 | 9 | 8 | 9.5 | 9.75 |

Examples 8-10 and Comparative Example C2

To a commercial high pigment content Exterior Benjamin Moore Eggshell deep base color Dark Blue was added the inventive emulsion in amounts of from 1.5 to 3% by weight. Test panels were produced by using an applicator blade with a 6-mil clearance to sealed paper test cards. A panel with no additive was also prepared for comparative purposes (Comparative Example 2). Following ASTM D4926 the panels were conditioned at room temperature for 7 days then cut out 3.8 cm by 3.8 cm sections of the paint chart. The cut sections were placed with the paint surfaces to face to face for each paint. Weights, stoppers were placed in oven for 30 minutes then allowed to cool for a half hour then by slow and steady force the sections were pulled apart next to the ear to hear the degree of tack. The blocking was rated by ASTM D4946-89, and the results are as follows.

TABLE 3

| Example | C2 | 8 | 9 | 10 |
|---|---|---|---|---|
| wt. % organosilicon composition (as 60% emulsion) | 0 | 1.5 | 2 | 3 |
| Blocking Resistance | 4 | 6 | 7 | 9 |

The results show that even a relatively minor amount of the inventive emulsion is effective to significantly increase blocking resistance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A highly pigmented aqueous coating composition containing a film forming polymer as a binder, which has a high blocking resistance, comprising: from 0.5 to 15 weight percent of anti-blocking organosilicon composition based on the total weight of the aqueous coating composition, the anti-blocking organosilicon composition comprising components A, B, and C:

A) 100 parts by weight of at least one aminoalkyl-functional organopolysiloxane;
B) from 1 to 20 parts by weight of at least one aminoalkyl-functional alkoxysilane or partial hydrolysis product thereof, and
C) from 10 to 500 parts by weight of at least one silanol-functional organopolysiloxane free of aminoalkyl groups, wherein the parts by weight of components B and C are relative to 100 parts by weight of A, and wherein the weight percentage of the antiblocking organosilicon composition in the aqueous coating formulation is based on use of an aqueous emulsion of A, B, and C having a solids content of 60 weight percent of A, B, and C.

2. The highly pigmented aqueous coating composition of claim 1, wherein aminoalkylalkoxysilane B is present in an amount of 2 to 10 parts by weight relative to 100 parts by weight A.

3. The highly pigmented aqueous coating composition of claim 1, wherein aminoalkylalkoxysilane B is present in an amount of 3 to 7 parts by weight relative to 100 parts by weight A.

4. The highly pigmented aqueous coating composition of claim 1, wherein component C has a viscosity of from 50 mPas to 50,000 mPas, and is present in an amount of 100 to 400 parts by weight relative to 100 parts of component A.

5. The highly pigmented aqueous coating composition of claim 1, wherein component C has a viscosity of from 1000 mPas to 10,000 mPas and is present in an amount of 150 to 300 parts by weight relative to 100 parts by weight of component A.

6. The highly pigmented aqueous coating composition of claim 1, wherein the aminoalkylalkoxysilane comprise those of the formula

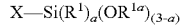

wherein X is an Si—C bonded aminoalkyl group,
$R^{1a}$ is a hydrocarbon group,
$R^1$ is a hydrocarbon group, and
a is 0, 1, or 2.

7. A method for improving the blocking resistance of a pigmented aqueous coating composition containing a film forming polymer binder, comprising:
adding to the aqueous coating composition, an amount of an anti-blocking organosilicon composition effective to increase the blocking resistance of a dried coating prepared from the aqueous coating composition, the anti-blocking organosilicon composition comprising components A, B, and C:

A) 100 parts by weight of at least one aminoalkyl-functional organopolysiloxane;
B) from 1 to 20 parts by weight of at least one aminoalkyl-functional alkoxysilane or partial hydrolysis product thereof, and
C) from 10 to 500 parts by weight of at least one silanol-functional organopolysiloxane free of aminoalkyl groups, and wherein the parts by weight of components B and C are relative to 100 parts by weight of A, and wherein the weight percentage of the antiblocking organosilicon composition in the aqueous coating formulation is based on an aqueous emulsion of A, B, and C having a solids content of 60 weight percent of A, B, and C.

8. The method of claim 7, wherein aminoalkylalkoxysilane B is present in an amount of 2 to 10 parts by weight relative to 100 parts by weight A.

9. The method of claim 7, wherein aminoalkylalkoxysilane B is present in an amount of 3 to 7 parts by weight relative to 100 parts by weight A.

10. The method of claim 7, wherein component C has a viscosity of from 50 mPas to 50,000 mPas, and is present in an amount of 100 to 400 parts by weight relative to 100 parts of component A.

11. The method of claim 7, wherein component C has a viscosity of from 1000 mPas to 10,000 mPas and is present in an amount of 150 to 300 parts by weight relative to 100 parts by weight of component A.

12. The method of claim 7, wherein the aminoalkylalkoxysilanes comprise those of the formula

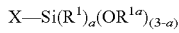

wherein X is an Si—C bonded aminoalkyl group,
$R^{1a}$ is a hydrocarbon group,
$R^1$ is a hydrocarbon group, and
a is 0, 1, or 2.

13. The method of claim 7, wherein the anti-blocking organosilicon composition is supplied as an aqueous emulsion.

14. The method of claim 7, wherein the aqueous emulsion is added to the aqueous coating formulation in an amount of from 0.5 to 15 weight percent based on the total weight of the blocking resistant aqueous coating composition, the weight percent relative to an anti-blocking organosilicon emulsion containing 60 weight percent of the total of A), B), and C).

15. The method of claim 7, wherein the blocking resistance of the pigmented aqueous coating composition without the anti-blocking organosilicon composition is raised by at least 2 when the blocking resistance measured on a scale of 0 to 10 per ASTM D4946-89.

* * * * *